US006763380B1

(12) United States Patent
Mayton et al.

(10) Patent No.: US 6,763,380 B1
(45) Date of Patent: Jul. 13, 2004

(54) METHODS, SYSTEMS AND COMPUTER PROGRAM PRODUCTS FOR TRACKING NETWORK DEVICE PERFORMANCE

(75) Inventors: Kim Irvin Mayton, Durham, NC (US); Joan Marie Bellinghausen, Cary, NC (US); Peter James Schwaller, Raleigh, NC (US)

(73) Assignee: NetIQ Corporation, San Jose, CA (US)

( * ) Notice: Subject to any disclaimer, the term of this patent is extended or adjusted under 35 U.S.C. 154(b) by 0 days.

(21) Appl. No.: 09/479,523

(22) Filed: Jan. 7, 2000

(51) Int. Cl.$^7$ .......................... G06F 9/00; G06F 15/173
(52) U.S. Cl. ...................... 709/224; 709/102; 709/105; 709/223
(58) Field of Search ................................. 709/224, 223, 709/105, 102; 379/1.01, 32.01; 370/241

(56) References Cited

U.S. PATENT DOCUMENTS

| | | |
|---|---|---|
| 4,545,011 A | 10/1985 | Lyon et al. |
| 5,049,873 A | 9/1991 | Robins et al. |
| 5,107,450 A | 4/1992 | Lawrenz |
| 5,257,393 A | 10/1993 | Miller |
| 5,572,640 A | 11/1996 | Schettler |
| 5,634,009 A | 5/1997 | Iddon et al. |
| 5,675,741 A * | 10/1997 | Aggarwal et al. .......... 395/200 |
| 5,706,436 A | 1/1998 | Lewis et al. |
| 5,732,213 A | 3/1998 | Gessel et al. |
| 5,764,915 A | 6/1998 | Heimsoth et al. |
| 5,809,286 A * | 9/1998 | McLain et al. ............. 395/500 |
| 5,838,919 A * | 11/1998 | Schwaller et al. .......... 709/224 |
| 5,881,237 A | 3/1999 | Schwaller et al. |
| 5,937,165 A | 8/1999 | Schwaller et al. |
| 6,112,239 A * | 8/2000 | Kenner et al. .............. 709/224 |

OTHER PUBLICATIONS

Talpade et al., Traffic–based Network Monitoring Framework for Anomaly Detection, Jul. 6–8, 1999, Computes and Communications, 199. Proceedings. IEEE, pp. 442–451.*
Butterfield, "System Performance Monitor/2 Reference," International Business Machines Corporation (1991).

(List continued on next page.)

Primary Examiner—Joseph H. Feild
Assistant Examiner—Chau Nguyen
(74) Attorney, Agent, or Firm—Myers Bigel Sibley & Sajovec

(57) ABSTRACT

Methods, systems and computer program products for tracking network device performance are provided which, in various embodiments, may track device performance by acquiring and storing routing information for communication connections over the network on a scheduled basis during normal operations and responsive to exception events. Network performance measurements may be obtained on a repeated basis, for example, pursuant to a test schedule. The performance measurements may be obtained from either active or passive testing. A traceroute may be initiated for a plurality of connections (for example, client to server) on a repeated basis, for example, a periodic basis, and the performance measurements for each connection for the same time period may be associated with the detected routing information to provide baseline information relating to the performance of one or more routes which support each connection. In addition, the network performance measurement system may detect exception events based on the performance measurements and initiate traceroutes responsive to detected exception events and associate the exception events with the detected routing information as well. Accordingly, IT staffs may be provided the opportunity to compare different routings to detect relatively poor performing routings and identify the network devices included in poor performance routings.

31 Claims, 10 Drawing Sheets

OTHER PUBLICATIONS

Brochure "Nextpoint".
Brochure, "NextPoint Frame Relay™".
Article, Sobel, Ken; *"Compuware's EcoSCOPE"*; *Hurwitz Group, Inc.* (9/97).
Brochure, "The DA–30® family of internetwork analyzers", Wandel & Goltermann (1994).
Brochure, "DA–30C benchmarking Capabilities", Wandel & Goltermann (1995).
Brochure, "Vital Signs VisionNet", BlueLine Software, Inc., including inserts "LAN Agent", "VTAM Agent", "NCPL Agent" (1995).
Brochure, Vital Signs VisionNet (1995).
Brochure, "SmartBits: Switch testing in its simplest form. . .", Netcom Systems, Inc. (1995).
Brochure, "EconNet™:Networked Applications Performance Management", Compuware Corporation (1995).
Brochure, Hot off the Shelf: Application Management, Data Communications (Jan. 1996).
Brochure, "10 Reasons Why You Need an Applications View of Your Network," Compuware Corporation (Jan. 9, 1996).
Brochure, "Network General Corporation: Products and Services", Network General Corporation (1995).
Brochure, "Pro View: Network Performance Management Systems", Network Telemetrics, Inc. (1995).
Brochure, "Managing the User Environment across Integrated SNA and IP Networks", Network Telemetrics, Inc. (1995).
Brochure, "Using Performance Baselines to Manage Network Service Levels", Williamson, W., Network Telemetrics, Inc. (1995).
Brochure, "Standard Based Distributed Diagnostics for Enterprise Networks", Frontier Software Development, Inc. (Sep. 1995).
Brochure, "QualityWorks—The most complete client/server testing solution you can buy", Segue Software Products (1996).
Brochure, "LANQuest: Net/WRx", LANQuest (Sep. 12, 1995).
Brochure, "Netbench(R) 3.01 Frequently Asked Questions", Ziff–Davis Benchmark Operation.
Brochure, EcoNET: The View from the Top, Hurwitz Consulting Group, Inc. (1995).
Brochure, "Visual OnRamp™ Managed Internet Access Device" (1/96) Same w/ 54.
Brochure, "FirstSense" Same w/ 43 ?.
Brochure, "VeriServ™," Response Networks, Inc. Same w/55.
Brochure, "Service Management Architecture Product Overview," Jyra Research, Inc. Same w/56.
Brochure, "Optimal Application Expert™" Optical Networks Corp. (1997) same w/51.
*Characterizing End–to–End Performance: A VitalSigns Whitepaper*, VitalSigns Software, Inc. 1998.
*Compuware EcoSystems Expands Application Performance Analysis Capabilities for Large Enterprises, Computware News Release*, Oct. 20, 1998.
Website Product Description of Patrol from BMC Software (12/98).
Brochure, "First Sense Agent" 1998.
VitalAgent from INS Brochure, 5/98.
Brochure, "Luminate TimePiece".
Website Product Description of Luminate for SAP R/3 (12/98).
Website Product Description of Envive for SAP R/3 (12/98).
Brochure, "NetScout" 1997.
Brochure, "Sniffer" 1998.
Brochure, "NetMetrix from Hewlett Packard" 1995.
Application Expert from Optimal Networks Corp. Brochure, 1999.
Brochure, "EcoSCOPE" from Compuware Corp., 1998.
Brochure, "EcoSCOPE" from Compuware Corp., 1/99.
Visual Onramp from Visual Networks, Inc., 1/96.
VeriServ from Response Networks, Inc. Brochure, 11/97.
SLM from Jyra Research, Inc. Brochure, 1997.
VitalAnalysis from VitalSigns Software Brochure, 1/98.
VitalAnalysis from VitalSigns Software, Inc. Brochure, 6/96.

* cited by examiner

Trace Route Report
Print Date/Time: 05/11/1999
Reporting Period: 05/10/1999 12:00:00 AM – 05/10/1999 11:59:59 PM

Last Exception Route

| Run Date | : 05/10/99 1:00:00PM | Total Hops | : | 40 |
|---|---|---|---|---|
| Route ID | : 3 | Exception Route Latency | : | 2.560 sec |
| Baseline Route Frequency | :10.00% | Baseline Route Latency | : | 0.510 sec |

Comparison of Last Exception Route to Baseline

| Hop | Address | Last Exception Hop Latency (sec) | Baseline (sec) | Delta (sec) | Hop | Address | Last Exception Hop Latency (sec) | Baseline (sec) | Delta (sec) |
|---|---|---|---|---|---|---|---|---|---|
| 1 | 121.1.7.12 | 0.130 | 0.112 | 0.018 | 4 | 144.232.1.73 | 2.270 | 0.417 | 1.853 |
| 2 | 144.232.3.133 | 0.230 | 0.220 | 0.010 | 5 | 137.39.23.6 | 2.340 | 0.480 | 1.860 |
| 3 | 144.232.8.98 | 0.200 | 0.305 | -0.105 | 6 | 162.1.1.7 | 2.560 | 0.510 | 2.050 |

| | Endpoint 1 | Endpoint 2 |
|---|---|---|
| Name | Sales 102 | Domino 8i |
| Address | 121.3.98.12 | 162.1.1.7 |
| Location | Paris | New York |
| Department | Retail Sales | Accounting |
| Protocol | TCP | |
| Application | Lotus Notes | |
| Trace Route Interval | Every 4 hours | |
| Comments | | |

FROM FIG. 6A.

Route Frequency from Sales 102 to Domino 8

| Route ID | Hops | 2-wk Baseline Route Frequency | 2-wk Baseline Route Latency (sec) | Exception Route Frequency | Avg Exception Route Latency (sec) |
|---|---|---|---|---|---|
| 1 | 4 | 3.00% | 0.278 | 5.00% | 0.316 |
| 2 | 5 | 80.00% | 0.412 | 9.00% | 0.500 |
| 3 | 6 | 10.00% | 0.510 | 75.00% | 2.450 |
| 4 | 6 | 5.00% | 0.523 | 4.00% | 1.940 |
| 5 | 7 | 0.00% | - | 1.00% | 2.600 |
| 6 | 5 | 2.00% | 0.423 | 6.00% | 1.545 |

Route Details

| Route ID | Hop | 2-wk Baseline Hop Latency (sec) | Avg. Exception Hop Latency (sec) | Address | Name |
|---|---|---|---|---|---|
| 1 | 1 | 0.124 | 0.137 | 121.1.7.12 | gs1.b.cc.net |
|   | 2 | 0.210 | 0.230 | 144.232.3.133 | sl-bb4-ann-7.b.ff.net |
|   | 3 | 0.230 | 0.289 | 137.39.23.6 | sap.cc.hp.net |
|   | 4 | 0.278 | 0.316 | 162.1.1.7 | Domino_8i.xx.com |
| 2 | 1 | 0.128 | 0.131 | 121.1.7.12 | gs1.b.cc.net |
|   | 2 | 0.222 | 0.254 | 144.232.3.133 | sl-bb4-ann-7.b.ff.net |
|   | 3 | 0.276 | 0.302 | 144.232.1.73 | sl-bb7-dc-8.b.ff.net |
|   | 4 | 0.300 | 0.450 | 137.39.23.6 | sap.cc.hp.net |
|   | 5 | 0.412 | 0.500 | 162.1.1.7 | Domino_8i.xx.com |
| 3 | 1 | 0.112 | 0.142 | 121.1.7.12 | gs1.b.cc.net |
|   | 2 | 0.220 | 0.224 | 144.232.3.133 | sl-bb4-ann-7.b.ff.net |
|   | 3 | 0.305 | 0.321 | 144.232.8.98 | sl-bb1-ann-4.b.ff.net |
|   | 4 | 0.417 | 1.845 | 144.232.1.73 | sl-bb7-dc-8.b.ff.net |
|   | 5 | 0.480 | 2.010 | 137.39.23.6 | sap.cc.hp.net |
|   | 6 | 0.510 | 2.450 | 162.1.1.7 | Domino_8i.xx.com |

FROM FIG. 6B.

| | | | | Address | Name |
|---|---|---|---|---|---|
| 4 | 1 | 0.121 | 0.280 | 121.1.7.12 | gs1.b.cc.net |
| | 2 | 0.230 | 0.456 | 144.232.3.133 | sl-bb4-ann-7.b.ff.net |
| | 3 | 0.300 | 1.200 | 144.232.1.73 | sl-bb7-dc-8.b.ff.net |
| | 4 | 0.428 | 1.600 | 144.232.8.98 | sl-bb1-ann-4.b.ff.net |
| | 5 | 0.490 | 1.759 | 137.39.23.6 | sap.cc.hp.net |
| | 6 | 0.523 | 1.940 | 162.1.1.7 | Domino_8i.xx.com |
| 5 | 1 | - | 0.300 | 121.1.7.12 | gs1.b.cc.net |
| | 2 | - | 0.320 | 144.232.3.133 | sl-bb4-ann-7.b.ff.net |
| | 3 | - | 0.600 | 144.232.1.73 | sl-bb7-dc-8.b.ff.net |
| | 4 | - | 0.510 | 144.232.8.98 | sl-bb1-ann-4.b.ff.net |
| | 5 | - | 0.750 | 144.232.3.142 | sl-bb4-ann-9.b.ff.net |
| | 6 | - | 1.200 | 137.39.23.6 | sap.cc.hp.net |
| | 7 | - | 2.600 | 162.1.1.7 | Domino_8i.xx.com |
| 6 | 1 | 0.212 | 0.300 | 121.1.7.12 | gs1.b.cc.net |
| | 2 | 0.289 | 0.760 | 144.232.3.133 | sl-bb4-ann-7.b.ff.net |
| | 3 | 0.340 | 1.120 | 144.232.8.98 | sl-bb1-ann-4.b.ff.net |
| | 4 | 0.378 | 1.200 | 137.39.23.6 | sap.cc.hp.net |
| | 5 | 0.423 | 1.545 | 162.1.1.7 | Domino_8i.xx.com |

Last 10 Exception Routes

| Run Time | Exception Route ID | Hop | Latency (sec) | Address | Name |
|---|---|---|---|---|---|
| 05/10/99 1:00:00PM | 3 | 1 | 0.130 | 121.1.7.12 | gs1.b.cc.net |
| | 3 | 2 | 0.230 | 144.232.3.133 | sl-bb4-ann-7.b.ff.net |
| | 3 | 3 | 0.200 | 144.232.8.98 | sl-bb1-ann-4.b.ff.net |
| | 3 | 4 | 2.270 | 144.232.1.73 | osl-bb7-dc-8.b.ff.net |
| | 3 | 5 | 2.340 | 137.39.23.6 | sap.cc.hp.net |
| | 3 | 6 | 2.560 | 162.1.1.7 | Domino_8i.xx.com |

FROM FIG. 6C.

| | | | | | |
|---|---|---|---|---|---|
| 05/06/99 2:15:00AM | 2 | 1 | 0.128 | 121.1.7.12 | gs1.b.cc.net |
| | 2 | 2 | 0.222 | 144.232.3.133 | sl-bb4-ann-7.b.ff.net |
| | 2 | 3 | 0.400 | 144.232.1.73 | sl-bb7-dc-8.b.ff.net |
| | 2 | 4 | 0.276 | 137.39.23.6 | sap.cc.hp.net |
| | 2 | 5 | 0.300 | 162.1.1.7 | Domino_8i.xx.com |
| 05/05/99 12:30:00PM | 3 | 1 | 0.132 | 121.1.7.12 | gs1.b.cc.net |
| | 3 | 2 | 0.230 | 144.232.3.133 | sl-bb4-ann-7.b.ff.net |
| | 3 | 3 | 0.200 | 144.232.8.98 | sl-bb1-ann-4.b.ff.net |
| | 3 | 4 | 2.265 | 144.232.1.73 | sl-bb7-dc-8.b.ff.net |
| | 3 | 5 | 2.335 | 137.39.23.6 | sap.cc.hp.net |
| | 3 | 6 | 2.558 | 162.1.1.7 | Domino_8i.xx.com |
| 05/04/99 1:50:00PM | 6 | 1 | 0.215 | 121.1.7.12 | gs1.b.cc.net |
| | 6 | 2 | 0.121 | 144.232.3.133 | sl-bb4-ann-7.b.ff.net |
| | 6 | 3 | 0.300 | 144.232.8.98 | sl-bb1-ann-4.b.ff.net |
| | 6 | 4 | 0.441 | 137.39.23.6 | sap.cc.hp.net |
| | 6 | 5 | 0.300 | 162.1.1.7 | Domino_8i.xx.com |
| 05/04/99 11:44:00AM | 2 | 1 | 0.128 | 121.1.7.12 | gs1.b.cc.net |
| | 2 | 2 | 0.222 | 144.232.3.133 | sl-bb4-ann-7.b.ff.net |
| | 2 | 3 | 0.400 | 144.232.1.73 | sl-bb7-dc-8.b.ff.net |
| | 2 | 4 | 0.276 | 137.39.23.6 | sap.cc.hp.net |
| | 2 | 5 | 0.300 | 162.1.1.7 | Domino_8i.xx.com |

FROM FIG. 6D.

| | | | | |
|---|---|---|---|---|
| 05/04/99 10:00:00AM | | | | |
| | 5 | 1 | 0.125 | 121.1.7.12 | gs1.b.cc.net |
| | 5 | 2 | 0.510 | 144.232.3.133 | sl-bb4-ann-7.b.ff.net |
| | 5 | 3 | 0.309 | 144.232.1.73 | sl-bb7-dc-8.b.ff.net |
| | 5 | 4 | 0.826 | 144.232.8.98 | sl-bb1-ann-4.b.ff.net |
| | 5 | 5 | 0.201 | 144.232.3.142 | sl-bb4-ann-9.b.ff.net |
| | 5 | 6 | 0.271 | 137.39.23.6 | sap.cc.hp.net |
| | 5 | 7 | 0.208 | 162.1.1.7 | Domino_8i.xx.com |
| 05/04/99 7:00:00AM | | | | |
| | 4 | 1 | 0.142 | 121.1.7.12 | gs1.b.cc.net |
| | 4 | 2 | 0.310 | 144.232.3.133 | sl-bb4-ann-7.b.ff.net |
| | 4 | 3 | 0.344 | 144.232.1.73 | sl-bb7-dc-8.b.ff.net |
| | 4 | 4 | 0.610 | 144.232.8.98 | sl-bb1-ann-4.b.ff.net |
| | 4 | 5 | 0.120 | 137.39.23.6 | sap.cc.hp.net |
| | 4 | 6 | 0.186 | 162.1.1.7 | Domino_8i.xx.com |
| 05/03/99 5:00:00AM | | | | |
| | 3 | 1 | 0.132 | 121.1.7.12 | gs1.b.cc.net |
| | 3 | 2 | 0.230 | 144.232.3.133 | sl-bb4-ann-7.b.ff.net |
| | 3 | 3 | 0.200 | 144.232.8.98 | sl-bb1-ann-4.b.ff.net |
| | 3 | 4 | 2.265 | 144.232.1.73 | osl-bb7-dc-8.b.ff.net |
| | 3 | 5 | 2.335 | 137.39.23.6 | sap.cc.hp.net |
| | 3 | 6 | 2.558 | 162.1.1.7 | Domino_8i.xx.com |
| 05/02/99 2:30:00AM | | | | |
| | 3 | 1 | 0.132 | 121.1.7.12 | gs1.b.cc.net |
| | 3 | 2 | 0.230 | 144.232.3.133 | sl-bb4-ann-7.b.ff.net |
| | 3 | 3 | 0.200 | 144.232.8.98 | sl-bb1-ann-4.b.ff.net |
| | 3 | 4 | 2.265 | 144.232.1.73 | osl-bb7-dc-8.b.ff.net |
| | 3 | 5 | 2.335 | 137.39.23.6 | sap.cc.hp.net |
| | 3 | 6 | 2.558 | 162.1.1.7 | Domino_8i.xx.com |

FIG. 6E.

METHODS, SYSTEMS AND COMPUTER PROGRAM PRODUCTS FOR TRACKING NETWORK DEVICE PERFORMANCE

FIELD OF THE INVENTION

The present invention, generally, relates to network communication methods, systems and computer program products and, more particularly, to systems, methods and computer program products for performance testing of computer networks.

BACKGROUND OF THE INVENTION

Companies are often dependent on mission-critical network applications to stay productive and competitive. To achieve this, information technology (IT) organizations preferably provide reliable application performance on a 24-hour, 7-day-a-week basis. In this demanding environment, frequent network expansion and day-to-day fire fighting often leave little time for IT managers to manage network performance proactively. Accordingly, IT managers typically rely on some form of system management and/or network management tools to help automate performance management tasks to increase the efficiency of the IT staffs. Even with these tools, IT staffs are typically required to commit resources to integrating and customizing the tools to work in the heterogeneous network environments which may include, for example, hardware from a variety of vendors, executing a variety of operating systems and communication protocols and supporting a variety of application programs for different end user requirements.

Various known system management products track specific information, such as the CPU utilization on a server, server paging and disk access activity, or client application response time. This information may be useful when solving problems on a network. These products can generally be categorized as passive systems or application monitors. This category typically is implemented as software agent technologies that reside on the client or server computers. They generally passively monitor live application transactions and monitor resource utilization. Products in this category include Patrol from BMC Software, Inc., FirstSense Agent from FirstSense Software, Inc., VitalAgent from INS, Luminate Software Corp., and Envive Corp. As they are passive application monitors, they typically support specific application programs. For example, Luminate Software and Envive support the SAP R/3 application. Their measurements are generally neither consistent nor repeatable, as a user's interaction with a given application varies over time. Moreover, they are typically not suited to detecting system slowdowns or failures from the perspective of an end user. Operations for one such passive monitor are described in "Characterizing End-to-End Performance: A VitalSigns Whitepaper," VitalSigns Software, Inc. 1998.

Another approach to passive monitoring is directed to the network infrastructure rather than the overall system. On the network side, element managers or passive network monitors are known which may address a specific segment or device on the network. Element managers are generally software designed to manage specific groups of devices, such as routers and switches. Passive network monitors are typically a combination of hardware and software that may, for example, monitor network traffic at the link layer or at the infrastructure devices. Products falling in this category include remote monitor (RMON) probes from NetScout Systems, Inc., Sniffer from Network Associates, NetMetrix from Hewlett-Packard, Application Expert from Optimal Networks Corp., EcoSCOPE from Compuware Corp., and Visual OnRamp from Visual Networks, Inc. These network management tools typically provide information such as packet loss, bit rates, and network utilization. This type of information may be helpful in fixing a network problem after the problem has been identified. However, as with the passive system monitors, these tools generally do not reflect network performance as experienced by a user. These tools are passive, in that they generally watch the network traffic which traverses a network segment or link, rather than actively creating traffic.

Passive network monitors sometimes include a basic scheduler to collect sample data from their data sources. A basic scheduler generally merely specifies the frequency (e.g., once every 15 minutes) at which the management console of the monitor should collect data from the data sources. Passive monitors are limited in that they are typically expensive to scale, only see traffic that is on the network at the time. Also, if an anomaly event occurs, it is often desirable to collect performance data at the time of the anomaly event. Approaches limited to scheduled collection typically do not address this need.

Another category of system management tool is active application monitors. These are products that generally measure performance by actively emulating application transactions. These transactions are often referred to as "synthetic" transactions. Products in this category include Ganymede Software Inc.'s Chariot® and Pegasus™ products, as described in U.S. Pat. Nos. 5,838,919, 5,881,237 and 5,937,165, VeriServ from Response Networks, Inc. and SLM from Jyra Research Inc. VeriServ allows an operator to define the types of applications to be monitored, times and days, and the end user locations from which the transactions are to originate. The operator may also choose to define alarm thresholds. Agents installed at the end user location monitor actual sample application transactions to measure performance of the applications operating over the network environment. VeriServ automatically tests applications at a fixed interval. SLM provides the flexibility for the user to schedule synthetic transactions for any interval from 5 minutes to a year. However, as these approaches are also typically directed to a particular application and require that the applications be installed and operating to generate network traffic, they generally only address simple web and database transactions. Also, any new or custom applications may require extensive configuration by the users to allow the tester to interact with the applications. In addition, active network testers add traffic to the communication network being tested, thereby using network resources which would otherwise be available for users.

A further tool available to IT staffs in many network environments, such as client-server networks supporting the Internet Protocol (IP), is the traceroute utility. It is known to IT staffs in such environments that, on receipt of a performance complaint from a user, the IT staff may manually execute a traceroute between the client device of the complaining user and the server device associated with the network communication flows related to the complaint. A traceroute may provide an identification of each of the devices in the network connection path between the client and the server at the time of execution of the traceroute utility by the IT staff.

As the range of information available to IT staffs from network performance tools increases, IT staffs face increasing challenges in attempting to analyze the large volumes of resulting data to identify and respond to problems promptly.

The increasing complexity of networks and the variety of applications and users utilizing those networks in a client-server environment makes the challenge even greater for IT staffs. These problems are further exacerbated as networks are typically not static as new hardware and software application programs may be periodically added thereby changing the traffic characteristics on the network and the end user's experience of network performance. It is increasingly important to analyze the actual performance of the network to be tested without the constraints and limitations of these existing tools. It would also be beneficial to provide network performance tools that reduce the level of expertise about network topology required of IT personnel.

SUMMARY OF THE INVENTION

The present invention provides methods, systems and computer program products for tracking network device performance which, in various embodiments, may track device performance by acquiring and storing routing information for communication connections over the network on a scheduled basis during normal operations and responsive to exception events. Network performance measurements may be obtained on a repeated basis, for example, pursuant to a test schedule. The performance measurements may be obtained from either active or passive testing. A traceroute may be initiated for a plurality of connections (for example, client to server) on a repeated basis, for example, a periodic basis, and the performance measurements for each connection for the same time period may be associated with the detected routing information to provide baseline information relating to the performance of one or more routes which support each connection. In addition, the network performance measurement system may detect exception events based on the performance measurements and initiate traceroutes responsive to detected exception events and associate the exception events with the detected routing information as well. While performance measurements may provide end-to-end views of a connection, the routing information may provide insights into the network infrastructure. Accordingly, IT staffs may be provided the opportunity to compare different routings to detect relatively poor performing routings or outages (if routing is not complete between the first and second devices) and identify the network devices included in those routings (optionally, along with latency between hops and/or error information from the traceroute).

In one embodiment of the present invention, network device performance may be tracked. Network performance measurements are repeatedly obtained for a communication connection between a first device and a second device. A routing associated with the obtained network performance measurements are repeatedly determined, the determined routings being defined by a set of network devices establishing the corresponding communication connection. In addition, in one embodiment, additional information, such as the latency between hops or error information, for example when an outage or timeout is detected, may be obtained during the traceroute. The determined routings and associated network performance measurements are stored to provide baseline information related to performance of the determined routings. The routing in one embodiment related to an IP network includes running a traceroute between the first device and the second device within a determined time period of a time at which the associated network performance measurements are obtained.

In a further embodiment of the present invention, the network performance measurements associated with routings having a common set of network devices are grouped to provide network performance measurements for each of a plurality of particular routings, each of the particular routings having a different set of network devices establishing the corresponding communication connection. The provided network performance measurements and the associated particular routings are stored to provide network performance measurements for each of the particular routings between the first device and the second device.

In another embodiment of the present invention, an exception event is detected based on the obtained network performance measurements. A traceroute between the first device and the second device is run responsive to detection of the exception event. The exception event is, preferably, associated with one of the particular routings having a common set of network devices as provided by the traceroute run responsive to detection of the exception event. An exception event may be, for example, a transition from a normal to a critical condition for a performance measurement and/or a connection failure.

In another embodiment of the present invention, the network performance measurements for the particular routings between the first device and the second device and exception events for the particular routings between the first device and the second device are displayed. The network performance measurements may be displayed as an average time for each type of network performance measurement. The type of network performance characteristic may be selected from the group consisting of throughput, response time, availability and transaction rate. The exception events for the particular routings may be displayed as an exception rate.

As will further be appreciated by those of skill in the art, while described above primarily with reference to method aspects, the present invention may also be embodied as systems and/or computer program products.

BRIEF DESCRIPTION OF THE DRAWINGS

FIG. 6 illustrates an exemplary analysis report based on traceroute baseline and exception event operations according to an embodiment of the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the terms "coupled" and "connected" are intended to include both directly coupled/connected and indirectly coupled/connected.

As will be appreciated by one of skill in the art, the present invention may be embodied as methods, data processing systems (apparatus) and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

It is also to be understood that the present invention may be provided by combinations of steps for performing the specified functions and program instruction means for performing the specified functions. It will also be understood that these functions can be implemented by special purpose hardware-based computer systems which perform the specified functions or steps, or combinations of special purpose hardware and computer instructions.

Figure 1:
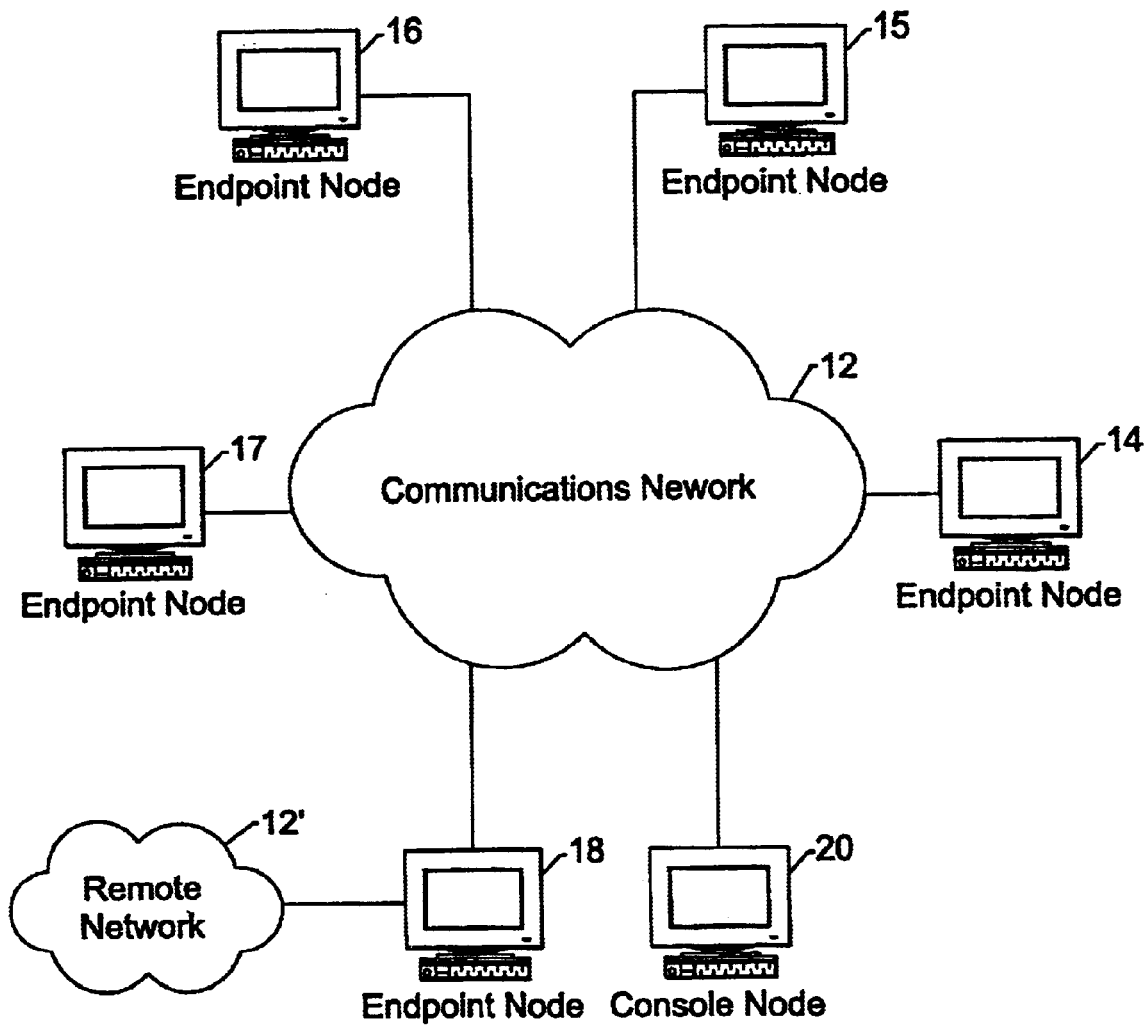
FIG. 1 schematically illustrates a hardware and software environment in which the present invention can operate.

Referring now to FIG. 1, a hardware and software environment in which the present invention can operate will now be described. As shown in FIG. 1, the present invention includes methods, systems and computer program products for tracking performance of devices on a communications network 12. Communications network 12 provides a communication link between endpoint nodes 14, 15, 16, 17, 18 and console node 20. While the endpoint nodes 14, 15, 16, 17, 18 are illustrated as termination points on the communications network 12, it is to be understood that, as used herein, an endpoint node may also be implemented in a device, such as a computer, which operates as a router, switch or other network device in the communications network 12.

As will be understood by those having skill in the art, a communications network 12 may be comprised of a plurality of separate linked physical communication networks which, using a protocol such as the Internet protocol (IP), may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17, 18. It is further to be understood that, while for illustration purposes in FIG. 1, communications network 12 is shown as a single network it may be comprised of a plurality of separate interconnected physical networks or partitioned sections of a physical network. As illustrated in FIG. 1, endpoint nodes 14, 15, 16, 17, 18 may reside on a computer. As illustrated by endpoint node 18, a single computer hardware system may comprise multiple endpoint nodes. However, for purposes of simplifying the description herein, endpoint nodes and associated hardware will be generally referred to as a unitary element unless referred to otherwise. As used herein, a "connection" refers to a linkage of a pair of endpoint nodes 14, 15, 16, 17, 18 over the communications network 12. A variety of routes including different network devices may be used by a single connection.

Network performance device tracking according to an embodiment of the present invention, as illustrated in FIG. 1, may be provided by a designated console node 20 and endpoint nodes 14, 15, 16, 17, 18. The console node 20 may also operate to control initiation and scheduling of endpoint node acquisition of data to provide test results for association with routing information between endpoint nodes 14, 15, 16, 17, 18. The test results may be obtained by active network testing or passive application monitoring at the endpoint nodes 14, 15, 16, 17, 18 with communications traffic over the communications network 12 being measured to provide test results, such as response time, transaction time, availability, throughput, and other measures as will be understood by those of skill in the art. As used herein, the term "availability" includes network availability and/or application availability. While the console node 20 is illustrated in FIG. 1 as implemented on a single computer, it is to be understood that the console node 20 may be implemented in part on each of a number of computers. For example, a first computer could act as a server and a second computer could act as a client device executing a browser application allowing a user to access the server computer. The actual data, in turn, could be stored in a storage device at the server computer or located on a network storage device associated with a third computer, remote from, and accessible to, the server computer. In other words, for such an embodiment, the console node 20 would be implemented across three computer devices.

Figure 2:
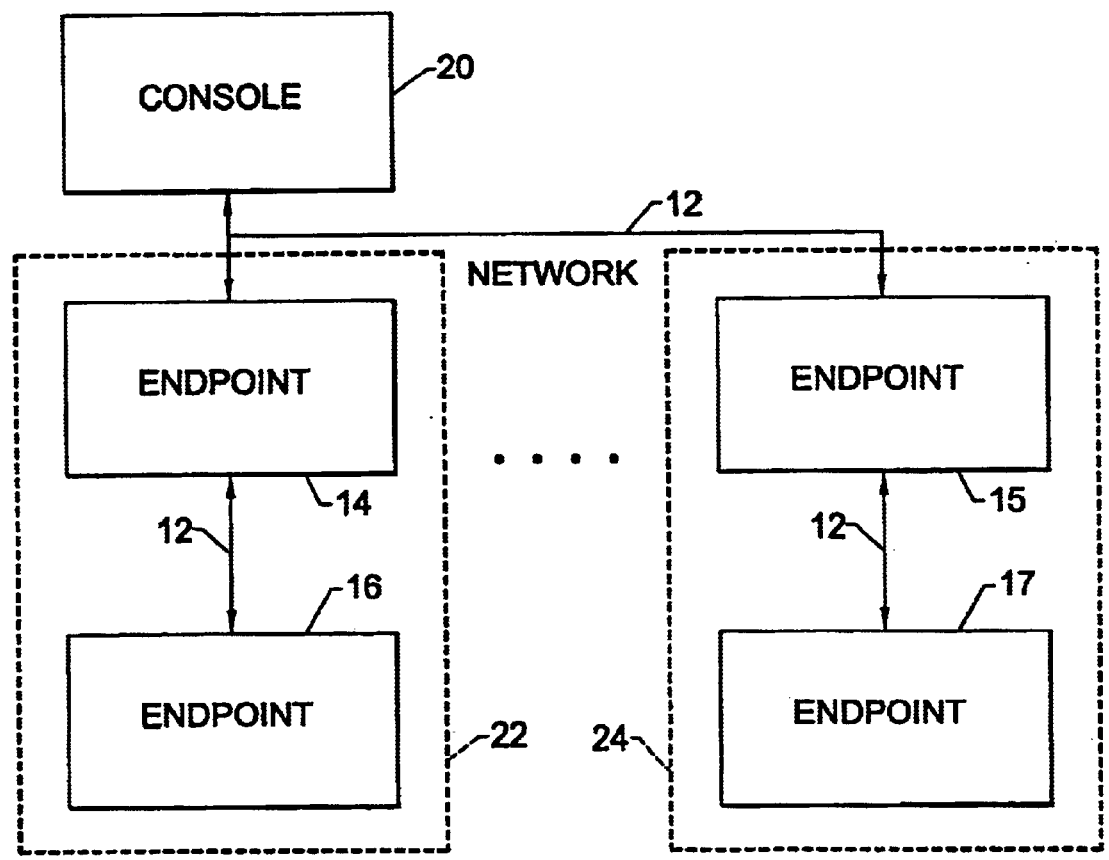
FIG. 2 is a block diagram of an embodiment of communications network performance testing according to the present invention.

As noted above, the present invention may be utilized for analysis of data from active test agents or passive application monitor agents. One such active agent is described in U.S. patent application Ser. No. 09/234,276 filed Jan. 19, 1999 and entitled "Methods, Systems and Computer Program Products for Scheduled Network Performance Testing" which is hereby incorporated by reference herein. As illustrated in the embodiment of an active system included in the block diagram of FIG. 2, application communication traffic may be simulated by communications between associated endpoint node pairs 22, 24. As illustrated in FIG. 2, endpoint node 14 and associated endpoint node 16 define a first endpoint node pair 22 associated with a first connection therebetween. Similarly, endpoint node 15 and associated endpoint node 17 define a second endpoint node pair 24 associated with a second connection. While it is preferred that application communication traffic be simulated by endpoint node pairs as illustrated in FIG. 2, it is to be understood that console node 20 may also perform as an endpoint node for purposes of a performance test. It is also to be understood that an endpoint node may be associated with a plurality of additional endpoint nodes to define a plurality of endpoint node pairs each associated with a connection and each of which may be provided a test schedule from the console node 20.

Console node 20 may obtain user input, for example by keyed input to a computer terminal or through a passive monitor, to define connections associated with pairs of endpoint nodes and a test schedule for each connection to test network 12. Console node 20, or other defining means may define a test schedule including a test protocol for the connections to simulate communications traffic between a plurality of selected endpoint nodes 14, 15, 16, 17, 18. Preferably, the test protocol is an endpoint pair based specific test protocol with a plurality,of endpoint node pairs executing respective associated test protocols in accordance with a test schedule. Each endpoint node 14, 15, 16, 17, 18 may be provided endpoint node information including an endpoint node specific network communication test protocol for the connection and the associated test schedule. The endpoint node information may also include result reporting frequency, connection ID, endpoint 1 requirements, endpoint 2 requirements, threshold critical values and threshold normal values. In addition, in connection with determining routing information between endpoints, the endpoint information may include criteria establishing what is considered an exception, for example, threshold values, whether to determine routing on particular types of exceptions, such as availability exceptions, and so on. Preferably, having been provided this information, the endpoint itself decides whether to determine routing information (such as by running a traceroute). Alternatively, the console node may detect the exception event and initiate the traceroute. Preferably, the network communication test protocols are based on a type of application communication traffic expected to provide a test protocol which simulates application communication traffic.

Console node 20, or other defining means, may define the connections and the test schedule for each connection including specifying the endpoint nodes associated with the connection and the underlying test protocols. Test protocols may contain information about a performance test including what test scripts and network protocol to use for communications between each endpoint pair 22, 24 defining connections. A given test protocol may include a plurality of different test scripts. Examples of test protocols and methods for using test protocols in network performance testing suitable for use with the present invention are described in U.S. Pat. No. 5,838,919 titled "Methods, Systems and Computer Program Products for Endpoint Pair Based Communications Network Performance Testing" which is incorporated herein by reference in its entirety.

In one embodiment of the present invention, as illustrated in FIG. 2, a test schedule with endpoint information including an endpoint node specific test protocol including a test script is provided first to a single endpoint node 14, 15 in each endpoint pair 22, 24. Endpoint 1 nodes 14, 15 insure that they can communicate with their respective endpoint node partners 16, 17. The endpoint 1 nodes 14, 15 then communicate an associated partner endpoint node test protocol to their respective endpoint node partners (endpoint 2 nodes) 16, 17. The associated partner endpoint node test protocol may be transmitted each time the test protocol is executed pursuant to the test schedule, thereby treating the endpoint node partners 16, 17 as if they have never previously received the protocol and relieving the endpoint node partners 16, 17 of the need to maintain previously received protocols. Alternatively, network traffic may be reduced by saving the previously transmitted associated partner endpoint node test protocol at the endpoint node partners 16, 17 and transmitting an initiate request to the endpoint node partners 16, 17 when the endpoint 1 nodes 14, 15 determine from the schedule that execution is required.

In a further alternative embodiment, endpoint 1 nodes 14, 15 may determine a corresponding test schedule including a partner endpoint node test protocol from a received test schedule and communicate that to endpoint 2 nodes 16, 17. It is to be understood that the partner test schedule including the partner endpoint node test protocol may alternatively be determined and communicated to endpoint 2 nodes 16, 17 from console node 20.

In practicing the present invention, network performance test results are generally based upon timing measurements. Accordingly, in generating the test results for analysis, as each endpoint node pair 22, 24 reaches predetermined checkpoints within a script, it creates timing records. The timing records may be returned to console node 20 which may use them to analyze the performance of communications network 12 by calculating statistics. Preferably, the endpoint nodes (or one of each pair) calculate network performance test results or measurements for a variety of types of performance measurements, for example, response times, from the timing measurements and report the calculated test results periodically to console node 20. Similarly, in a preferred embodiment, the endpoint nodes perform calculations to determine if an exception event has occurred although these calculations may be performed by the console node which, in turn, may initiate determination of routing information responsive to an exception event. Network performance measurement test results may include throughput, transaction rate, availability and response time. The test schedules, in addition to providing test protocols, may provide a schedule for each connection. The schedule preferably specifies the start time for initiating execution of the associated test protocol and a repeat schedule for re-initiating execution of the associated protocol. An expiration time may also be included for terminating re-execution of the associated test protocol to allow independently operating endpoint nodes to age out a schedule to avoid unintended burdening of a network 12 with test traffic. The test schedules of the different connections may, optionally, be coordinated to test particular combinations of test protocols concurrently executing over communication network 12.

Console node 20 or other means for analyzing, may provide means for analyzing reported network performance test results from endpoint node 14 or other selected reporting endpoint nodes 15, 16, 17, 18 to generate the performance measurements, such as throughput, response time and transaction rate. Alternatively, endpoint nodes 14, 15, 16, 17, 18 may analyze network data for a connection and provide the resulting performance measurements to console node 20 as network performance measurement test results. Systems, methods and computer program products providing for dynamic filtering for analysis of network performance measurement test results are described in concurrently filed U.S. patent application Ser. No. 09/479,523 entitled "Methods, Systems and Computer Program Products for Dynamic Filtering of Network Performance Test Results" which is hereby incorporated herein by reference as if set forth in its entirety.

Console node 20, or other means for detecting communications capabilities, may also detect communications capabilities of endpoint node 14, 15, 16, 17, 18 before establishing a connection and a test schedule using endpoint node 14, 15, 16, 17, 18. A pre-setup flow may, optionally, be sent from console node 20 to each endpoint node 14, 15, 16, 17, 18 identified as part of a connection or the information may be otherwise provided. The presetup flow may include a requirements list. The requirements list may include a string of bytes which indicate what communications, or other (for example, random sleep), capabilities endpoint node 14, 15, 16, 17, 18 need to support in order to execute their endpoint node specific test protocol under the test schedule. For example, if a test protocol uses TCP/IP as the network protocol between an endpoint node pair 22 and the test script uses Real-time Transport Protocol (RTP), the endpoint nodes of endpoint node pair 22 should support the following items which would be in the requirements list: User Datagram Protocol (UDP) and RTP (an optional feature built upon UDP to facilitate streaming of multimedia traffic). An active network test system including test schedules suitable for use with the present invention is described in U.S. patent application Ser. No. 09/234,276 filed Jan. 19, 1999 and entitled "Methods, Systems and Computer Program Products for Scheduled Network Performance Testing" which is hereby incorporated by reference herein.

The description of FIG. 2 above was generally provided with reference to active agent operations in which application scripts are initiated pursuant to a schedule and generate network traffic which is measured and processed to provide performance measurements. However, the console node 20 may also provide for initiation and analysis of passive application monitor generated network performance measurement test results. Preferably, both active and passive acquired test results are provided for analysis. Systems, methods and computer program products providing for both passive and active network testing which are suitable for use in providing data for analysis according to the present invention are described in concurrently filed U.S. patent application Ser. No. 09/479,565 entitled "Methods, Systems and Computer Program Products for Network Performance Testing Through Active Endpoint Pair Based Testing and Passive Application Monitoring" which is hereby incorporated herein by reference as if set forth in its entirety.

As described therein, application monitoring for one or more applications executing on one or more of the endpoint nodes 14, 15, 16, 17, 18 may be initiated by the console node 20 to generate passive application monitoring test results for analysis. Such results may be associated with applications executing on the endpoint nodes 14, 15, 16, 17, 18 and may also be associated with each of the endpoint nodes participating in a communication connection over the communications network 12. For example, in a client-server network environment, passive application monitoring can be selected for client devices and the generated test results may be associated with the client device, the server device and the application being monitored which generates traffic between the client and the server. As a result, performance can be analyzed broken down by client, server and application. Examples of applications to be monitored include Telnet, FTP, Lotus Notes, POP3 email, DNS, Web and other applications as will be understood by those of skill in the art which communicate, for example, using assigned ports of the client devices. The communication flows may be monitored, for example, by monitoring TCP/IP protocol stacks associated with the assigned ports of the client devices.

Scheduling of performance monitoring operations for an application monitor agent may proceed in a manner substantially the same as was described above with reference to active network testing in which scheduling of execution of application scripts is provided from a central console node 20 to a plurality of endpoint nodes 14–18. However, it is to be understood that parameters to be specified for application monitoring may include a select flag activating application and/or system monitoring, and an accumulation schedule for application monitoring or system monitoring data. This setup information may further specify the application(s) to be monitored, an associated port identification (range) for the applications which are to be monitored and other information, as will be understood by those of skill in the art allowing application monitor agents on an endpoint node 14, 15, 16, 17, 18 to associate monitored network communication flows with a particular application and to further associate such flows with a remote device which is communicating with the application resident on the computer in which the application monitor is executing. Accordingly, as with the accumulation of data broken down by first and second endpoint and application script for an active monitor as described above, passive application monitoring may provide generation of data which may be broken down by client and server and by application program being monitored.

In one aspect of the present invention, routing information is determined responsive to exception events. Exception events may be detected based on automatically established threshold criteria for a network performance measurement. Exception events may also be detected based on an availability criterion (for example, detection of a connection failure). This aspect of the present invention may utilize automatically established threshold criterion based on a specified percentage of baseline results for the network performance measurement type and may further utilize a user selected sensitivity of the threshold determination.

A user selected sensitivity percentage for the network performance measurement type may be obtained by the console node 20. The threshold criteria may then be established based on the obtained percentage. By way of example, if a user selects 90%, an increased sensitivity for detection of exception events may be provided as contrasted with a sensitivity percentage of 95%, 98% or so on. Where a sensitivity percentage of 100% is selected, substantially no exception events will be detected for the corresponding performance measurement type. The level for the respective network performance measurement type associated with the threshold criteria is preferably automatically updated as the historical data on the performance measurement type changes. Additional aspects of authothresholding which may be utilized to detect exception events in accordance with the present invention, such as providing a hysterises in threshold detection for exception events and/or requiring multiple consecutive readings above the threshold criteria may be provided as described, for example in U.S. patent application Ser. No. 09/234,276 previously incorporated by reference herein.

Figure 3:
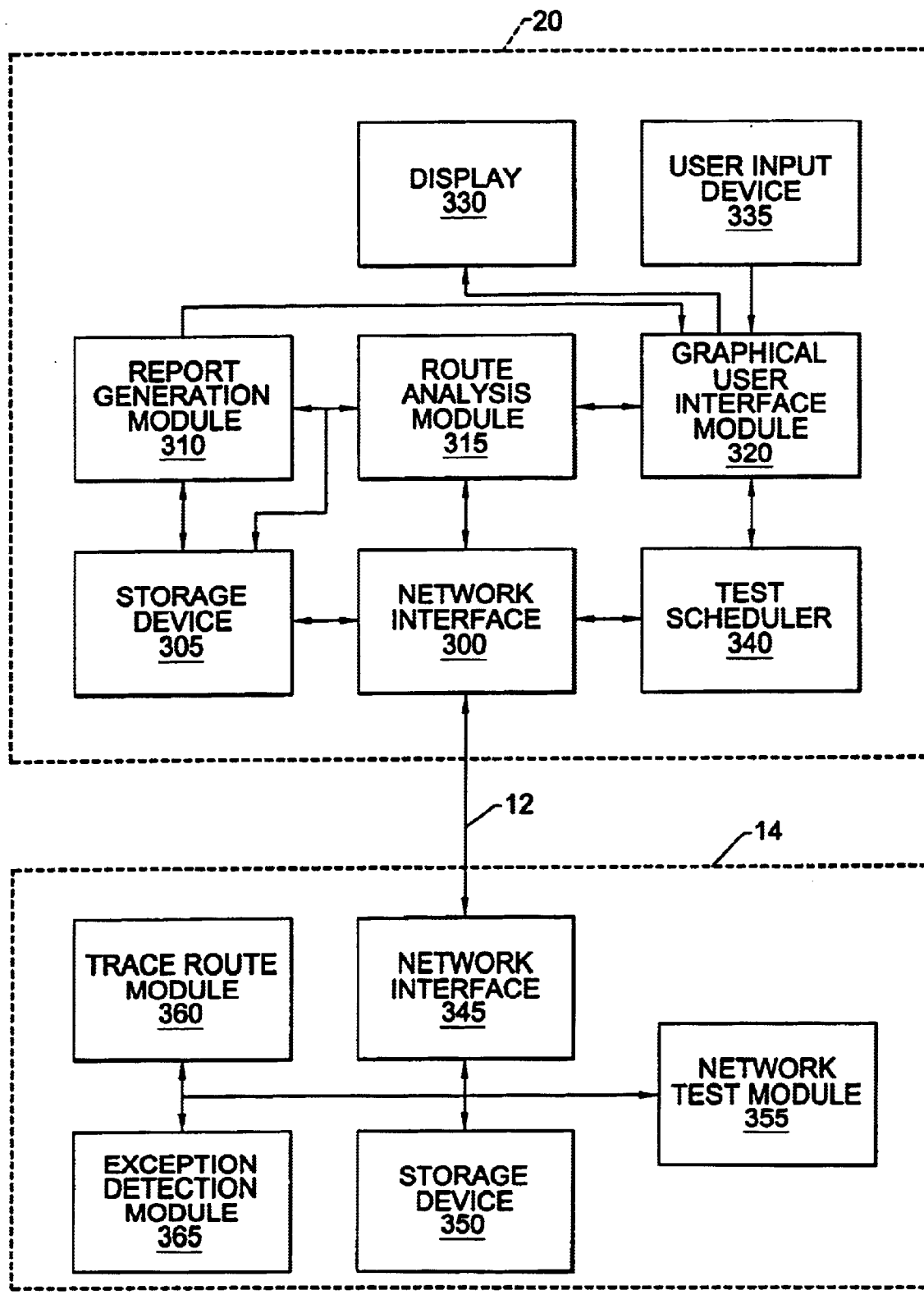
FIG. 3 is a block diagram of an embodiment of a system for tracking network device performance according to the present invention.

An embodiment of a console node 20 and an exemplary endpoint node 14 providing a system for tracking network device performance will now be further described with reference to the block diagram illustration of FIG. 3. As shown in the embodiment of FIG. 3, the console node 20 includes a network interface 300 coupled to the communications network 12. A storage device 305 stores network performance test results obtained from the endpoint nodes 14, 15, 16, 17, 18. The stored network performance test results may be derived from active network testing or passive application monitoring operations by the endpoint nodes 14, 15, 16, 17, 18.

Also shown in the console node 20 of the embodiment illustrated in FIG. 3 is a report generation module 310. The report generation module 310 may generate reports responsive to report requests which are either automatically generated for scheduled reports or responsive to specific user requests. Report generation module 310 may also provide capabilities for formatting and printing the reports. A reporting tool suitable for use with the present invention is the Crystal Reports program available from Seagate Software. Preferably, consistent with the use of web browser and Java based techniques according to one embodiment of the present invention, reports are generated in a Hyper-Text Markup Language (HTML) format.

In addition, a route analysis module 315 is provided in the console node 20 in FIG. 3. The route analysis module 315 may be configured to receive and store network performance measurements from the endpoint nodes 14, 15, 16, 17, 18 in a manner which associates the data with particular routings used by various client-server connections. In one embodiment, the route analysis module 315 is configured to group the network performance measurements associated with routings having a common set of network devices to provide network performance measurements for each of a plurality of particular routings. The network devices in each routing establish the corresponding communication connection where a particular connection between a first and second device, such as a client and server, may have more than one associated routing (or group of network devices). Alternatively, the data records may be individually stored in the storage device 305 and the report generation module 310 may filter those results to provide group results reflecting the network performance of various routes associated with different connections for which network performance measurement test results are available. For example, the network performance measurements may be grouped for display expressed as an average time for a type of network performance measurement characteristic associated with the respective measurements, with each routing for a connection being provided its respective average time. Similarly, exception events may be grouped and presented as an exception rate relative to the total transaction count for the relevant period over which the exception count is accumulated.

In addition, the illustrated console node 20 in FIG. 3 includes a graphical user interface module 320 which interfaces to a display 330 and a user input device 335, such as a mouse or a keyboard device. The graphical user interface module 320 is configured to display performance information including routing information for various connections on the display 330 as well as displaying other information related to user communications. The graphical user interface module 320 is further configured to receive user input from the user input device 335, such as a selection of a schedule for obtaining routing baseline information, and to provide the user input to the other modules of the console node 20, such as the route analysis module 315.

Finally, a test scheduler 340 is shown as being included in the console node 20 in the embodiment of FIG. 3. The test scheduler 340 may provide for transmission of test schedules related to routing baseline measurements and active network testing to the endpoint nodes 14, 15, 16, 17, 18 and may further provide for transmission of designations of applications for which passive application monitoring is requested to the endpoint nodes 14, 15, 16, 17, 18.

Also shown in the embodiment of FIG. 3 is an exemplary endpoint node 14. The endpoint node 14 includes a network interface 345 coupled to the communications network 12 which provides an interface which may support both network performance testing and communications with console node 20 over the communications network 12. A storage device 350 may be utilized by the endpoint node 14 to store test scheduling and configuration information as well as network performance and routing test results. A network test module 355 may be configured to support scheduling and initiation of active network testing, passive network testing and traceroute operations to provide baseline routing information according to various aspects of the present invention. Particular aspects related to acquisition of network performance test results have been described above and in the concurrently filed patent applications previously incorporated by reference herein and will not be further described herein except as related to the generation of information related to tracking the performance of various routings.

A traceroute module 360 in the endpoint node 14 is configured to repeatedly (a number of times over a baseline time period which may be a sliding window type time period) determine a routing associated with obtained network performance measurements where the routings are defined by a set of network devices establishing the corresponding communication connection for the network performance measurements. The traceroute module 360 may store the determined routings and associated network performance measurements in the storage device 350. The results, along with other network performance test measurements, may be provided to the console node 20 through the network interface 345 under the control of the network test module 355.

Also shown in the endpoint node 14 of FIG. 3 is an exception detection module 365. The exception detection module 365 provides for detection of exception events related to communications over the communications network 12 which are detected during network performance testing operations, for example, through the use of threshold crossing detection based on user defined or automatically updated threshold criterion. The exception detection module 365 is connected to the traceroute module 360 and is configured to initiate traceroute operations by the traceroute module 360 responsive to the detection of an exception event. The exception detection module 365 may include state information so that a traceroute may be run only on a transition, rather than continuously when in a critical state. While the traceroute module 360 and the exception detection module 365 are illustrated as separate modules in the embodiment of FIG. 3, it is to be understood that they may be included within the network test module 355. In any event, operations of the network test module 355, the traceroute module 360 and the exception detection module 365 are coordinated in a manner to allow routing information from the traceroute module 360 to be appropriately associated with the network performance measurement test results generated under the control of the network test module 355.

Operations of the present invention will now be described with respect to the flowchart illustration of FIG. 4. It will be understood that each block of the flowchart illustration and the block diagram illustrations of FIGS. 1–3 and combinations of blocks in the flowchart illustration and the block diagram illustrations, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustration and the block diagrams support combinations of means for performing the specified functions, combinations of steps for performing the specified functions and program instruction means for performing the specified functions. It will also be understood that each block of the flowchart illustration and block diagrams, and combinations of blocks in the flowchart illustration and block diagrams, can be implemented by special purpose hardware-based systems which perform the specified functions or steps, or combinations of special purpose hardware and computer instructions.

Figure 4:
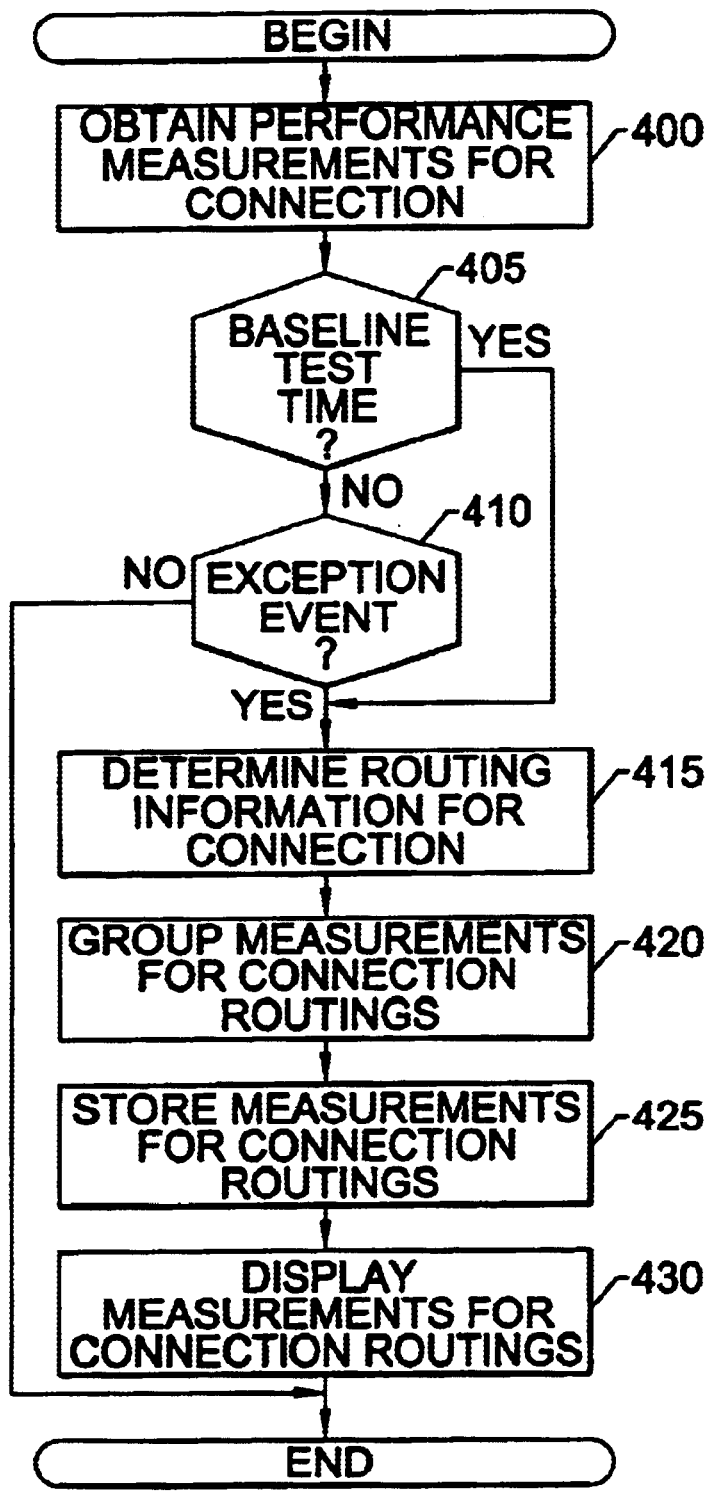
FIG. 4 is a flowchart illustrating operations for tracking network device performance according to an embodiment of the present invention.

Referring now to the flowchart illustration of FIG. 4 operations for tracking network device performance according to an embodiment of the present invention will now be further described. Operations begin at block 400 when network performance measurements are obtained for a communication connection between a first device, such as a client, and a second device, such as a server. If it is time to obtain baseline routing information (block 405), which may be a time different from the time schedule for obtaining the performance measurements, then a routing associated with the obtained network performance measurements is determined (block 415). Furthermore, as the operations at blocks 400 and 405 are repeated and may be based on separate schedules, the sequence of operations may be reversed and executed independently. As noted above, the determined routings are preferably defined by a set of network devices establishing the corresponding communication connection. If it is not yet time for a scheduled traceroute (block 405) but the obtained performance measurements indicate an exception event (block 410) a routing is also determined (block 415).

This tracerouting information may then be utilized to provide a user more information for assistance in isolating where in the network performance problems are occurring. For example, identifying the point of an outage or a poorly-performing device on the route could be used as a jumping off point to integrate with other network management tools for problem debugging. A variety of baseline test schedule times (block 405) may be selected. Preferably, baseline traceroute operations are executed at intervals from about one time per hour to about one time per day. The interval for running baseline traceroutes may also be provided as a user selectable variable. In addition to utilizing initiation of traceroutes responsive to exception events related to threshold crossings at block 410, initial connectivity failure events between a first and a second endpoint node may also be treated as exception events triggering automatic execution of traceroute operations. In addition, initiation of traceroute operations may be provided responsive to a specific user request.

Preferably, the traceroute information is time stamped with the time when the traceroute was run and then grouped with the network performance measurement information which initiated an exception event or which has a time stamp closest to that associated with the traceroute results. In addition, traceroute operations may be executed from either one or both of the respective endpoints. For example, the traceroute may be initiated from the client (first) device for a connection and need not be repeated at the server (second) device if it is desired to reduce the amount of traffic introduced on the communications network 12 in connection with traceroute operations. Furthermore, the user may be provided the ability to disable traceroute operations either on a per connection basis or for all connections. A user may further control traceroute operations by establishing a maximum number of hops (i.e. number of device connections) to provide as traceroute results. Note that connections for purposes of tracking routing information are preferably limited to one connection being associated with each pair of devices regardless of how many connections are defined for purposes of network performance testing for a given specific pair of devices. Operations related to initiation of traceroutes will be further described with reference to the schematic illustration of FIG. 5.

As shown in the embodiment of FIG. 4, once a number of associated measurements have been provided for one or more routes associated with various endpoint node connections, the measurement results may be grouped to provide associated results for each route for each connection (block 420). Accordingly, exception rate information and baseline performance level information may be provided using average values for the various performance measurements and other statistical information which may result in improved performance data for the respective routings for the various connections. The measurement results for each of the connection routings may also be stored (block 425) and displayed responsive to, for example, a user request (block 430). Preferably, a display is provided showing the respective network performance measurements expressed as an average time and/or as an average time trend over a selected time window for the connections and their routings for each type of network performance measurement. The network performance measurement types may be selected from the group consisting of throughput, response time, availability and transaction rate in various embodiments of the present invention. In addition, display operations at block 430 may include presenting exception events for the respective routings as an exception rate based upon the total number of transaction measurements obtained over the respective time window used for accumulation of the exception event count.

Figure 5:
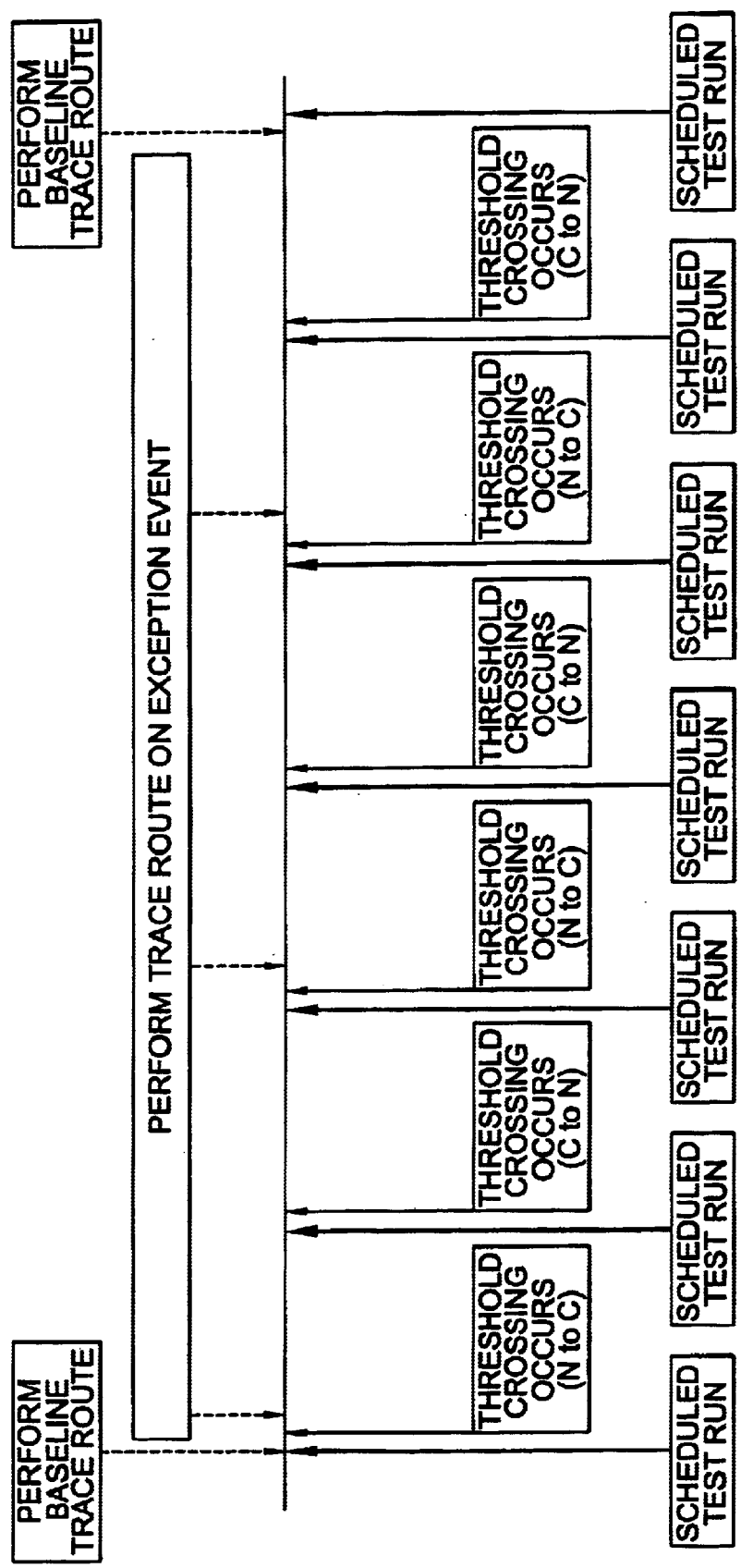
FIG. 5 is a schematic timing diagram illustrating scheduling of routing and performance measurement operations according to an embodiment of the present invention.

Referring now to FIG. 5 the scheduling of initiation of routing detection operations will be further described with reference to the illustrated example. As shown in the embodiment of FIG. 5 network performance measurements are periodically generated at Scheduled Test Run times. In the illustrated example of FIG. 5, baseline traceroute operations are performed on a periodic (i.e., a uniform time interval between each of the scheduled traceroutes) interval basis, although at a different rate than the scheduled test runs. As shown in the embodiment of FIG. 5, two Baseline Traceroute operations are executed in approximately the same time period over which seven Scheduled Test Runs are executed to obtain network performance measurements. The route obtained from the first illustrated Baseline Traceroute may be associated with Scheduled Test Runs occurring in a selected time period and the last illustrated Baseline Traceroute may be associated with Scheduled Test Runs occurring in its associated time period. In addition, three normal to critical (NtoC) Threshold Crossing events are shown as occurring during the illustrated time period. Traceroutes are initiated responsive to each of these exception events as illustrated in FIG. 5. No traceroutes are triggered by the critical to normal (CtoN) Threshold Crossing events. Note that, while a traceroute is executed responsive to each normal to critical threshold crossing in the illustrated embodiment, preferably, only an initial (or first) connectivity failure is used to trigger execution of a traceroute. Accordingly, the present invention may provide information related to the performance of various routings as well as identifications of associated network devices included in the routings for use by IT staffs in evaluating and resolving network performance problems.

FIG. 6 illustrates an exemplary display of traceroute information, including information comparing the route taken during an exception with the baseline routes and other exception routes. Six different routes are indicated as having been taken between a pair of endpoints (called "Sales 102" and "Domino 8*i*") during a preceding two week period. This report shows the most recent exception route, which took the route identified as route ID 3 in the Last Exception Route section. The Route Details section shows the devices on each hop of route 3 (as well as the other routes), along with the average latency for each hop for both baseline generated information and exception information. The Route Frequency section shows that, during the baseline period, route 2 is taken 80% of the time, while route 3 is taken 10% of the time and so on. However, during exception conditions, route 3 is taken 75% of the time. This may indicate to a network manager that route 3 is not a desirable route as most of the exception events are observed when route 3 is used for the connection. This data may further suggest implementing improvements to the devices on route 3, especially those with the most latency, as doing so may improve the performance of network traffic which takes this route.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for tracking network device performance comprising the steps of:
   repeatedly obtaining network performance measurements for a communication connection between a first device and a second device on a first schedule;
   repeatedly determining a routing associated with the obtained network performance measurements on a second schedule different from the first schedule, the determined routings being defined by a set of network devices establishing the corresponding communication connection; and
   storing the determined routings and associated network performance measurements to provide baseline information related to performance of the determined routings.

2. A method according to claim 1 wherein the step of periodically determining a routing comprises the step of running a traceroute between the first device and the second device within a determined time period of a time at which the associated network performance measurements are obtained.

3. A method for tracking network device performance comprising the steps of:
   repeatedly obtaining network performance measurements for a communication connection between a first device and a second device;
   repeatedly determining a routing associated with the obtained network performance measurements, the determined routings being defined by a set of network devices establishing the corresponding communication connection;
   storing the determined routings and associated network performance measurements to provide baseline information related to performance of the determined routings; and
   wherein the storing step is preceded by the step of grouping network performance measurements associated with routings having a common set of network devices to provide network performance measurements for each of a plurality of particular routings, each of the particular routings having a different set of network devices establishing the corresponding communication connection and wherein the storing step comprises the step of storing the provided network performance measurements and the associated particular routings to provide network performance measurements for each of the particular routings between the first device and the second device.

4. A method according to claim 3 further comprising the steps of:
   detecting an exception event based on the obtained network performance measurements; and
   running a traceroute between the first device and the second device responsive to detection of the exception event.

5. A method according to claim 4 further comprising the step of associating the exception event with one of the particular routings having a common set of network devices as provided by the traceroute run responsive to detection of the exception event.

6. A method according to claim 5 further comprising the step of displaying the network performance measurements for the particular routings between the first device and the second device and exception events for the particular routings between the first device and the second device.

7. A method according to claim 6 wherein the step of displaying further comprises the step of displaying the network performance measurements as an average time for each type of network performance measurement.

8. A method according to claim 7 wherein the type of network performance characteristic is selected from the group consisting of throughput, response time, availability and transaction rate.

9. A method according to claim 8 wherein the step of displaying further comprises the step of displaying the exception events for the particular routings as an exception rate.

10. A method according to claim 3 further comprising the step of displaying the network performance measurements for the particular routings between the first device and the second device.

11. A method according to claim 10 wherein the step of repeatedly determining a routing further comprises the step of determining routing associated information selected from the group consisting of latency and errors and wherein the step of storing the determined routings further comprises the step of storing the routing associated information.

12. A method according to claim 11 wherein the type of network performance characteristic is selected from the group consisting of throughput, response time, availability and transaction rate.

13. A system for tracking network device performance comprising:
   means for repeatedly obtaining network performance measurements for a communication connection between a first device and a second device on a first schedule;
   means for repeatedly determining a routing associated with the obtained network performance measurements on a second schedule different from the first schedule, the determined routings being defined by a set of network devices establishing the corresponding communication connection; and
   means for storing the determined routings and associated network performance measurements to provide baseline information related to performance of the determined routings.

14. A system according to claim 13 wherein the means for determining a routing comprises means for running a traceroute between the first device and the second device within a determined time period of a time at which the associated network performance measurements are obtained.

15. A system for tracking network device performance comprising:
   means for repeatedly obtaining network performance measurements for a communication connection between a first device and a second device;
   means for repeatedly determining a routing associated with the obtained network performance measurements, the determined routings being defined by a set of network devices establishing the corresponding communication connection;

means for storing the determined routings and associated network performance measurements to provide baseline information related to performance of the determined routings; and means for grouping network performance measurements associated with routings having a common set of network devices to provide network performance measurements for each of a plurality of particular routings, each of the particular routings having a different set of network devices establishing the corresponding communication connection and wherein the means for storing comprises means for storing the provided network performance measurements and the associated particular routings to provide network performance measurements for each of the particular routings between the first device and the second device.

16. A system according to claim 15 further comprising:

means for detecting an exception event based on the obtained network performance measurements; and means for running a traceroute between the first device and the second device responsive to detection of the exception event.

17. A system according to claim 16 further comprising means for associating the exception event with one of the particular routings having a common set of network devices as provided by a traceroute run responsive to detection of the exception event.

18. A system according to claim 17 further comprising means for displaying the network performance measurements for the particular routings between the first device and the second device and exception events for the particular routings between the first device and the second device.

19. A system according to claim 18 wherein the means for repeatedly determining a routing further comprises means for determining routing associated information selected from the group consisting of latency and errors and wherein the means for storing the determined routings further comprises means for storing the routing associated information.

20. A system according to claim 19 wherein the type of network performance characteristic is selected from the group consisting of throughput, response time, availability and transaction rate.

21. A system according to claim 20 wherein the means for displaying the network performance measurements for the particular routings further comprises means for displaying the exception events for the particular routings as an exception rate.

22. A computer program product for tracking network device performance, comprising:

a computer readable storage medium having computer readable program code embodied in said medium, said computer-readable program code comprising:

computer-readable program code that repeatedly obtains network performance measurements for a communication connection between a first device and a second device on a first schedule;

computer-readable program code that repeatedly determines a routing associated with the obtained network performance measurements on a second schedule different from the first schedule, the determined routings being defined by a set of network devices establishing the corresponding communication connection; and computer-readable program code that stores the determined routings and associated network performance measurements to provide baseline information related to performance of the determined routings.

23. A computer program product for tracking network device performance, comprising:

a computer readable storage medium having computer readable program code embodied in said medium, said computer-readable program code comprising:

computer-readable program code that repeatedly obtains network performance measurements for a communication connection between a first device and a second device;

computer-readable program code that repeatedly determines a routing associated with the obtained network performance measurements, the determined routings being defined by a set of network devices establishing the corresponding communication connection;

computer-readable program code that stores the determined routings and associated network performance measurements to provide baseline information related to performance of the determined routings; and computer-readable program code that groups network performance measurements associated with routings having a common set of network devices to provide network performance measurements for each of a plurality of particular routings, each of the particular routings having a different set of network devices establishing the corresponding communication connection and wherein the computer-readable program code that stores comprises computer-readable program code that stores the provided network performance measurements and the associated particular routings to provide network performance measurements for each of the particular routings between the first device and the second device.

24. A computer program product according to claim 23 further comprising:

computer-readable program code that detects an exception event based on the obtained network performance measurements; and computer-readable program code that runs a traceroute between the first device and the second device responsive to detection of the exception event.

25. A computer program product according to claim 24 further comprising computer-readable program code that displays the network performance measurements for the particular routings between the first device and the second device and exception events for the particular routings between the first device and the second device.

26. A computer program product according to claim 25 wherein the computer-readable program code that repeatedly determines a routing further comprises computer-readable program code that determines routing associated information selected from the group consisting of latency and errors and wherein the computer-readable program code that stores the determined routings further comprises computer-readable program code that stores the routing associated information.

27. A computer program product according to claim 26 wherein the type of network performance characteristic is selected from the group consisting of throughput, response time, availability and transaction rate.

28. A computer program product according to claim 27 wherein the computer-readable program code that displays the network performance measurements for the particular routings further comprises computer-readable program code that displays the exception events for the particular routings as an exception rate.

29. A method for tracking network device performance comprising:
   repeatedly obtaining network performance measurements for a communication connection between a first device and a second device;
   repeatedly determining a routing associated with the obtained network performance measurements, the determined routings being defined by a set of network devices establishing the corresponding communication connection;
   storing the determined routings and associated network performance measurements to provide baseline information related to performance of the determined routings;
   detecting an exception event based on the obtained network performance measurements; and
   automatically running a traceroute between the first device and the second device responsive to detection of the exception event.

30. A system for tracking network device performance comprising:
   means for repeatedly obtaining network performance measurements for a communication connection between a first device and a second device;
   means for repeatedly determining a routing associated with the obtained network performance measurements, the determined routings being defined by a set of network devices establishing the corresponding communication connection;
   means for storing the determined routings and associated network performance measurements to provide baseline information related to performance of the determined routings;
   means for detecting an exception event based on the obtained network performance measurements; and
   means for automatically running a traceroute between the first device and the second device responsive to detection of the exception event.

31. A computer program product for tracking network device performance comprising:
   a computer readable storage medium having computer readable program code embodied in said medium, said computer-readable program code comprising:
   computer-readable program code that repeatedly obtains network performance measurements for a communication connection between a first device and a second device;
   computer-readable program code that repeatedly determines a routing associated with the obtained network performance measurements, the determined routings being defined by a set of network devices establishing the corresponding communication connection;
   computer-readable program code that stores the determined routings and associated network performance measurements to provide baseline information related to performance of the determined routings;
   computer-readable program code that detects an exception event based on the obtained network performance measurements; and
   computer-readable program code that automatically runs a traceroute between the first device and the second device responsive to detection of the exception event.

* * * * *